(No Model.) 13 Sheets—Sheet 1.
J. P. MONROE.
GRAIN BINDER.
No. 429,465. Patented June 3, 1890.
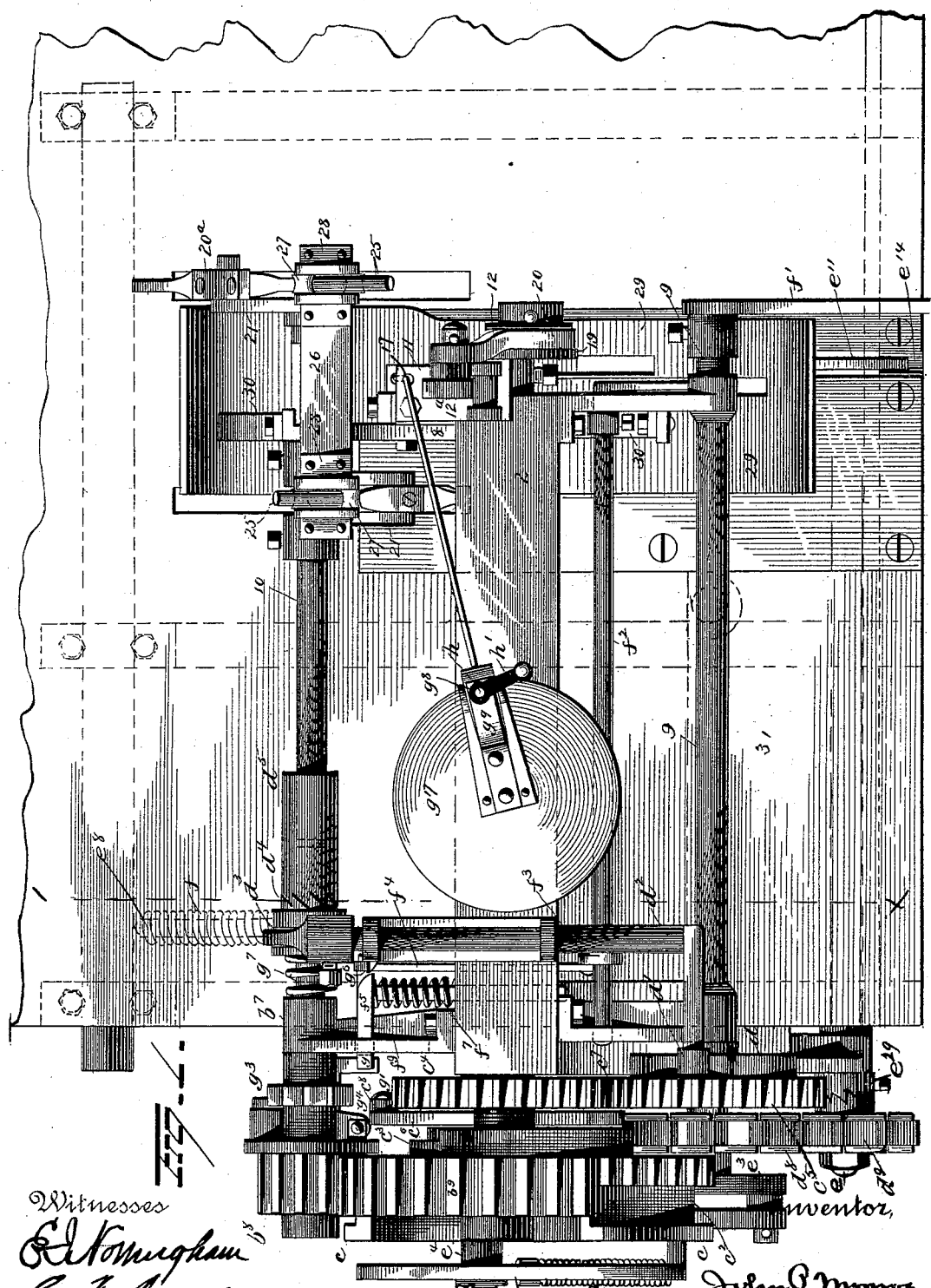
Witnesses
Inventor
John P. Monroe
Attorney

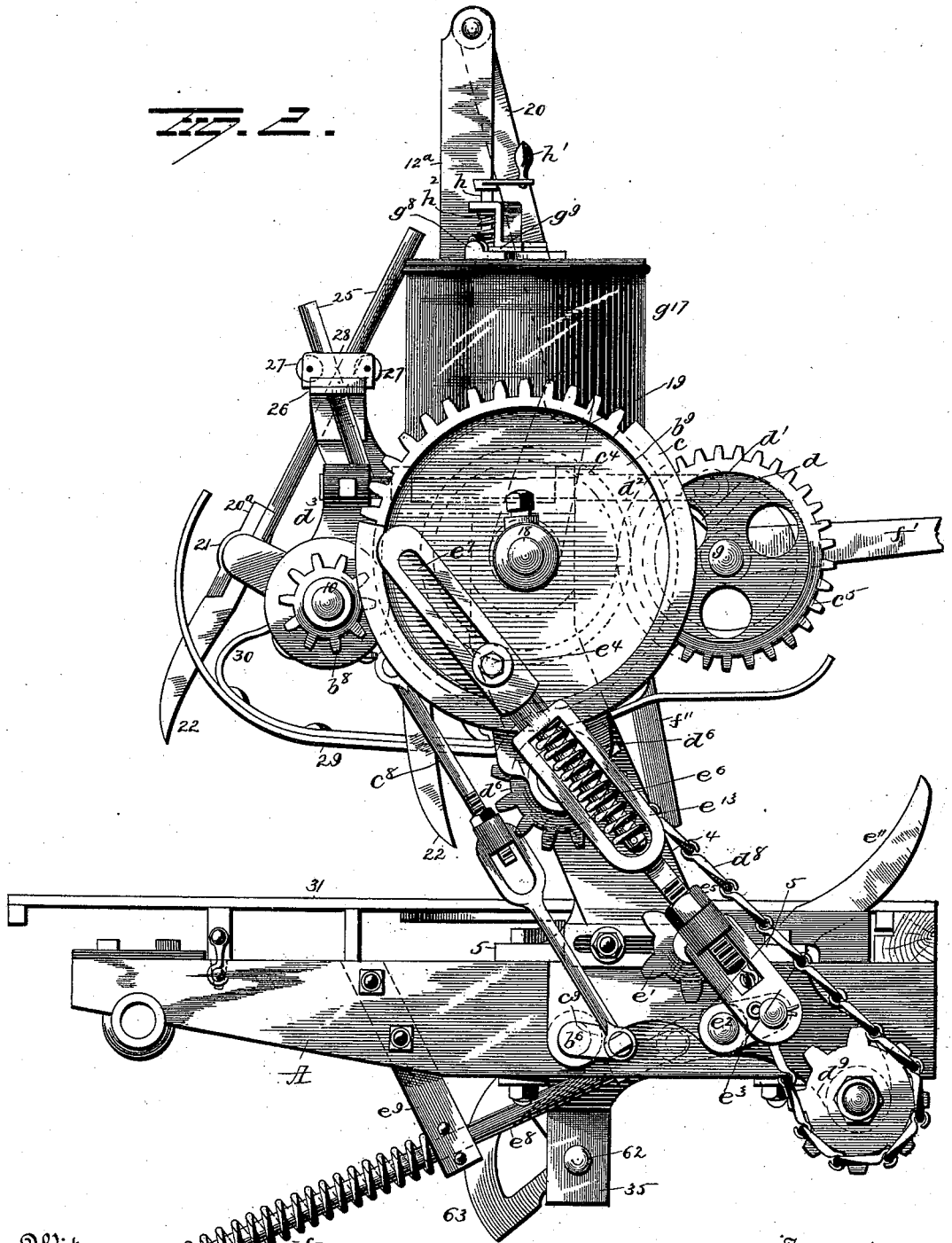

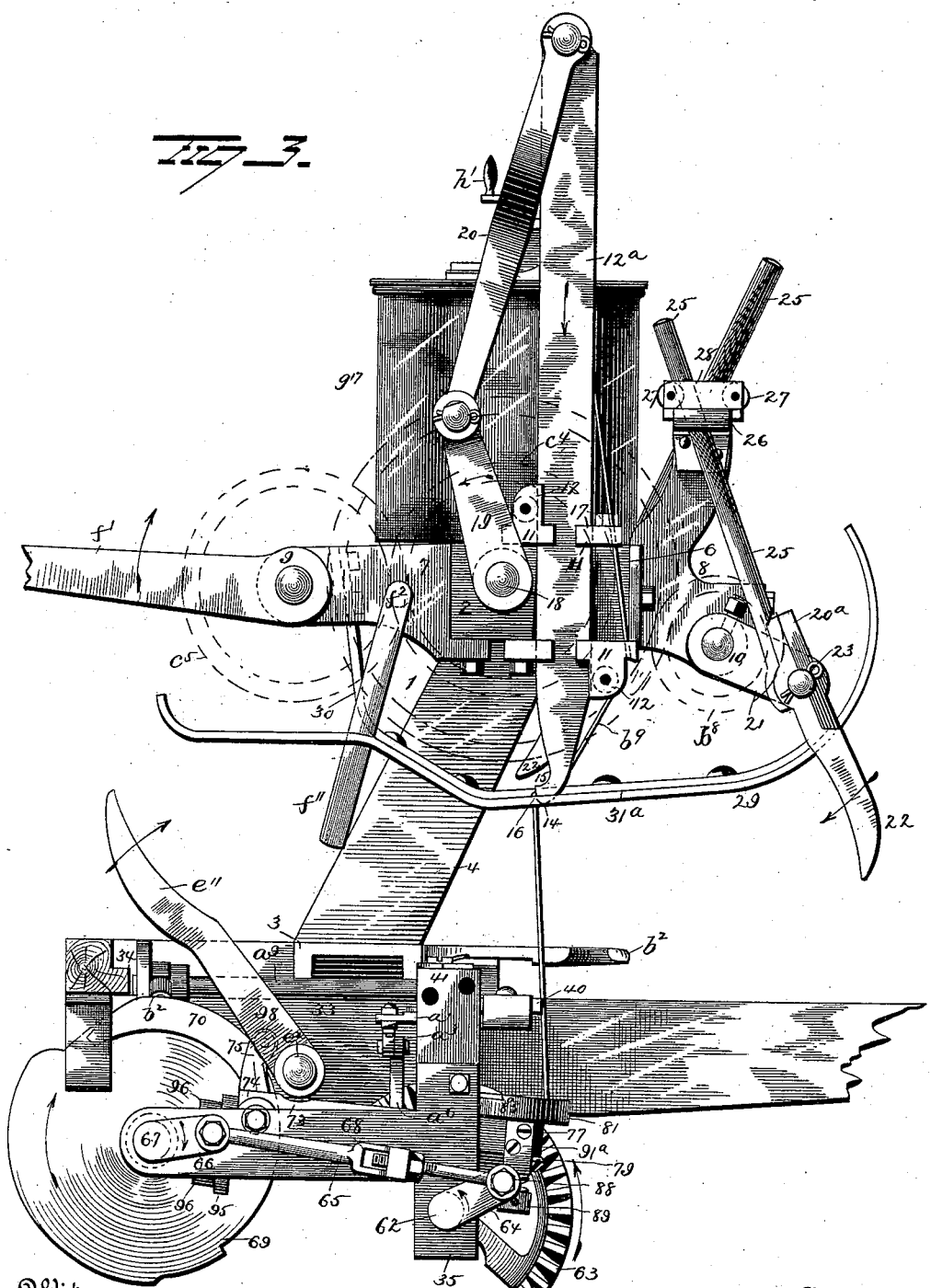

(No Model.)  13 Sheets—Sheet 4.
J. P. MONROE.
GRAIN BINDER.
No. 429,465.  Patented June 3, 1890.
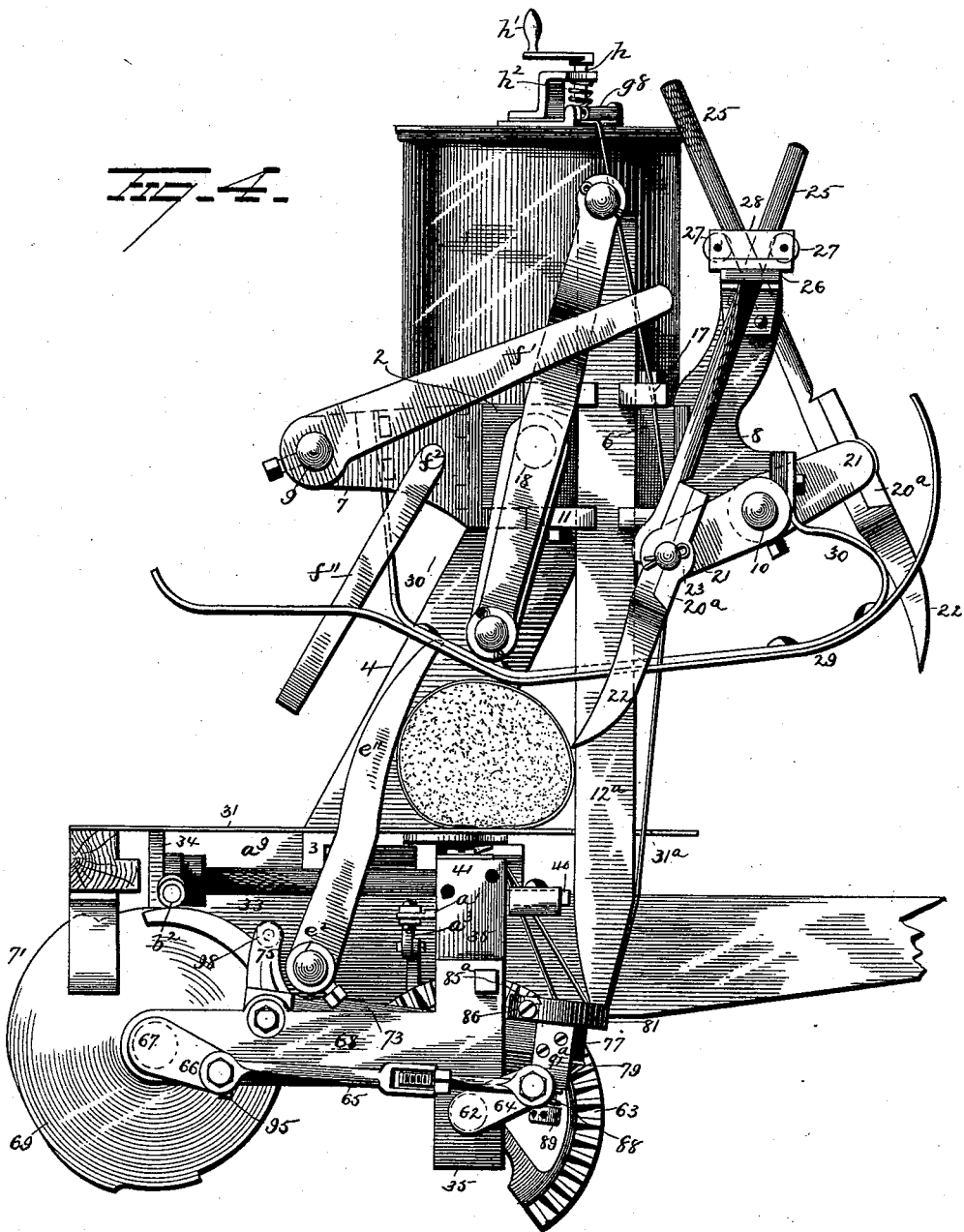
Witnesses
P. H. Nottingham.
G. F. Downing.
Inventor
John P. Monroe,
By his Attorney
H. A. Seymour

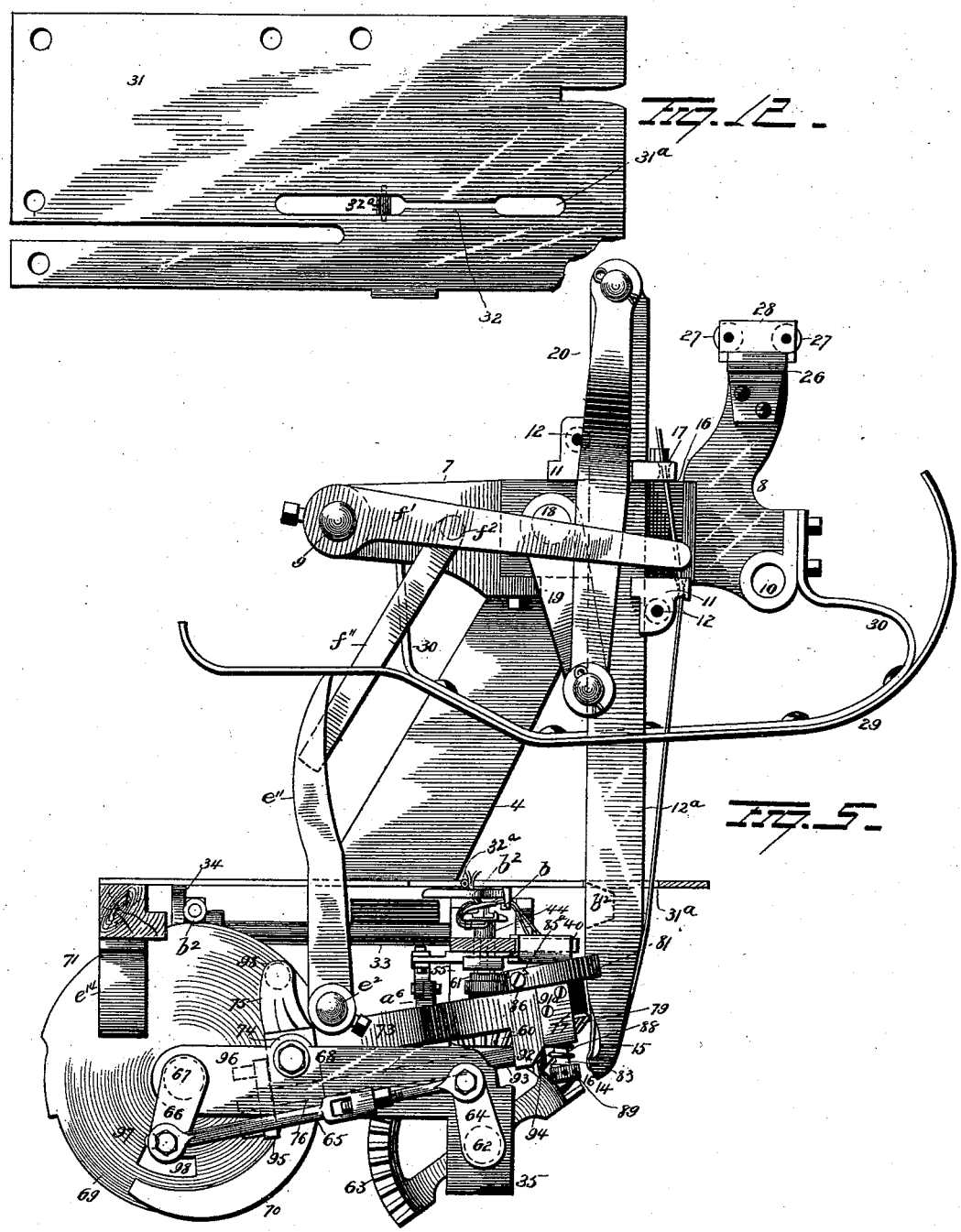

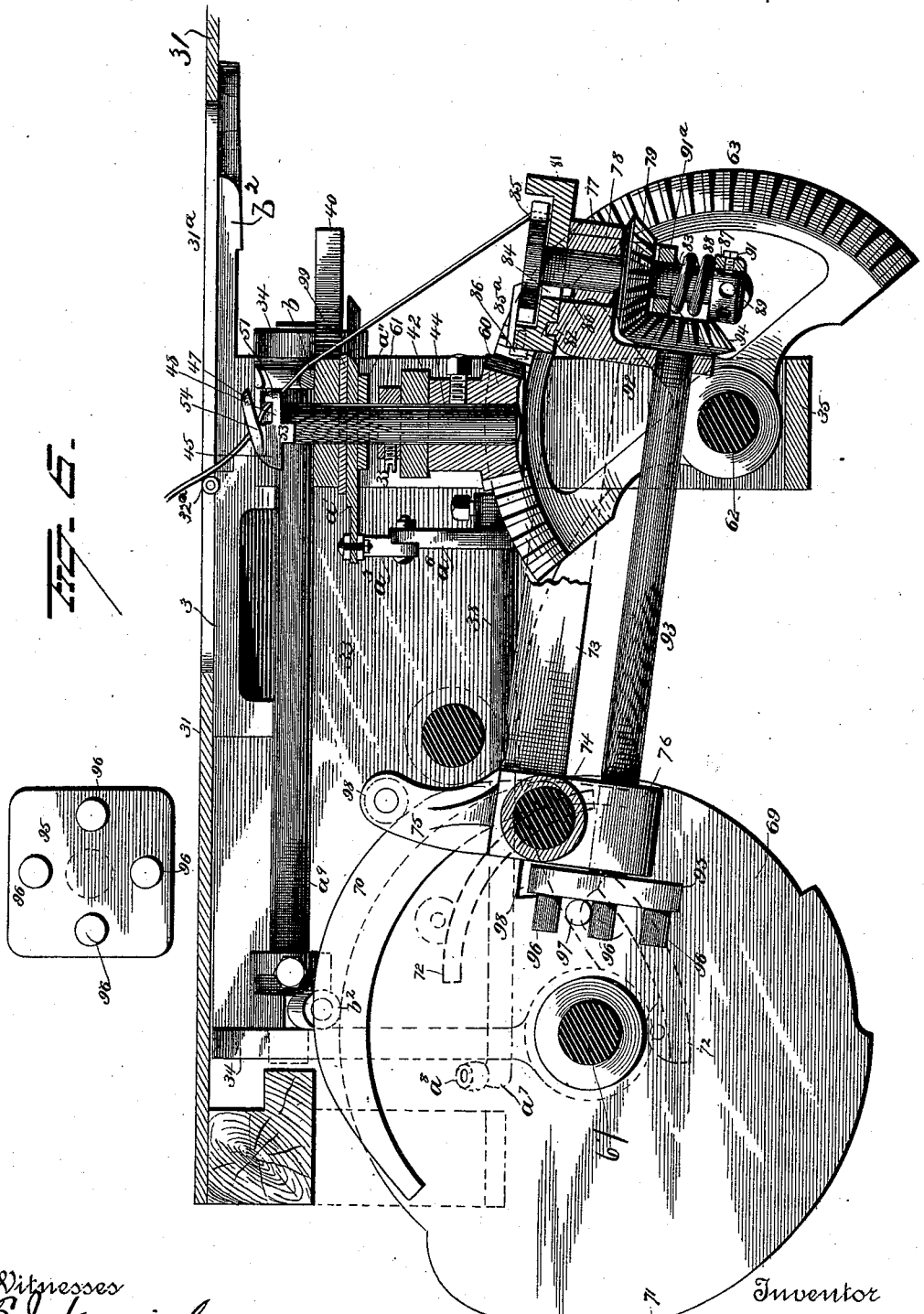

(No Model.)
13 Sheets—Sheet 7.
J. P. MONROE.
GRAIN BINDER.
No. 429,465.
Patented June 3, 1890.
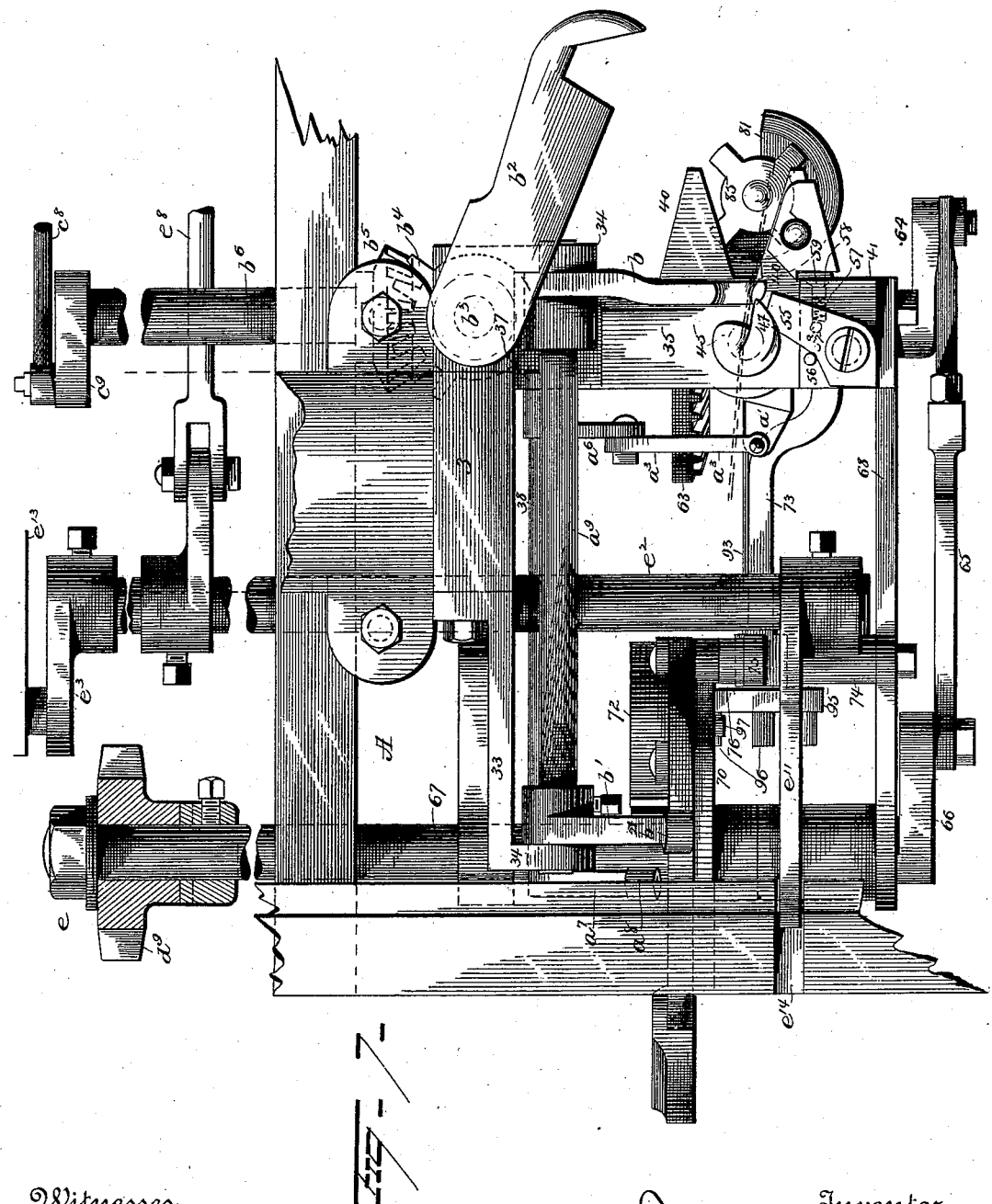
Witnesses
E. A. Nottingham
G. F. Downing
Inventor
John P. Monroe.
By his Attorney
H. A. Seymour.

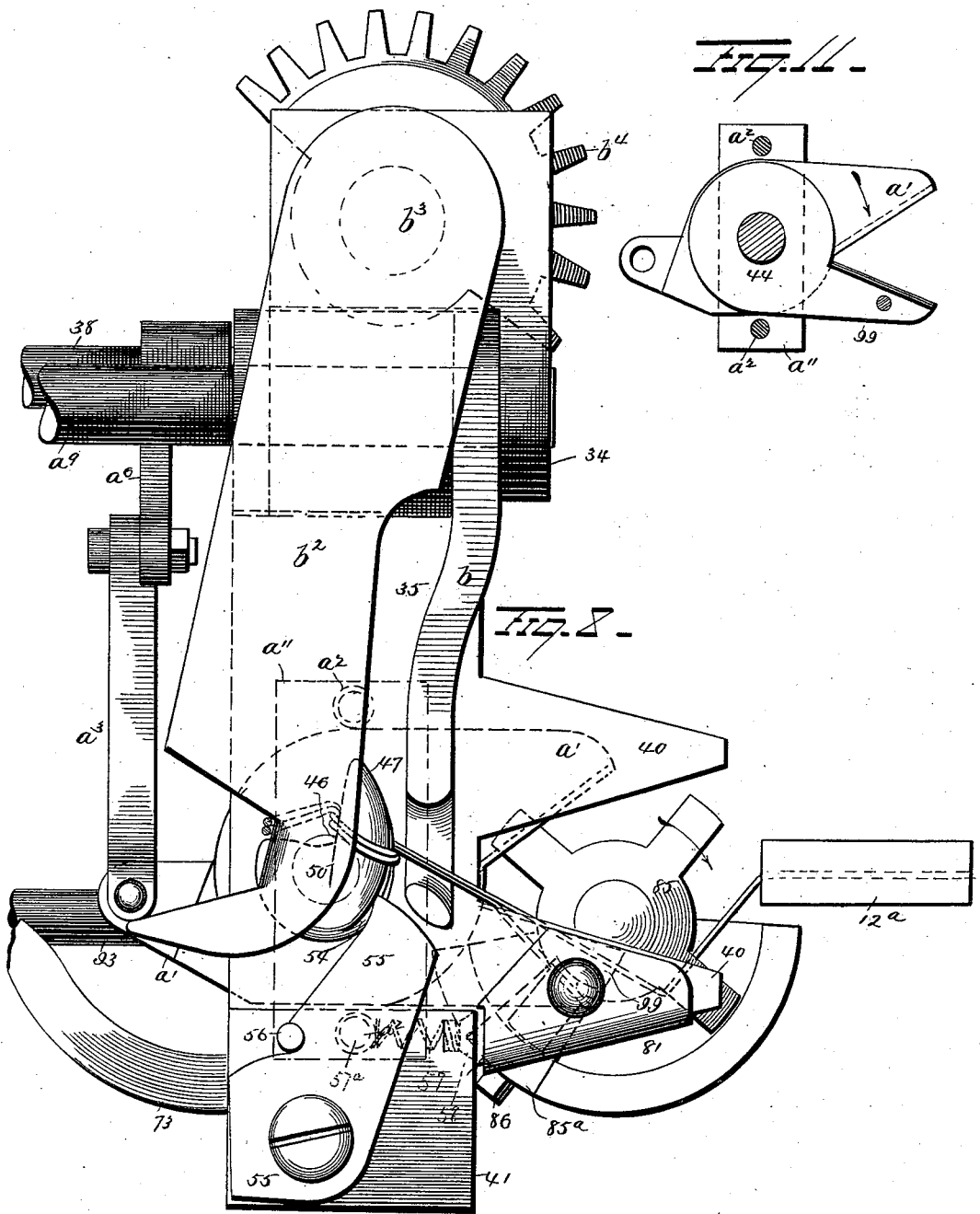

(No Model.) 13 Sheets—Sheet 9.
J. P. MONROE.
GRAIN BINDER.
No. 429,465. Patented June 3, 1890.
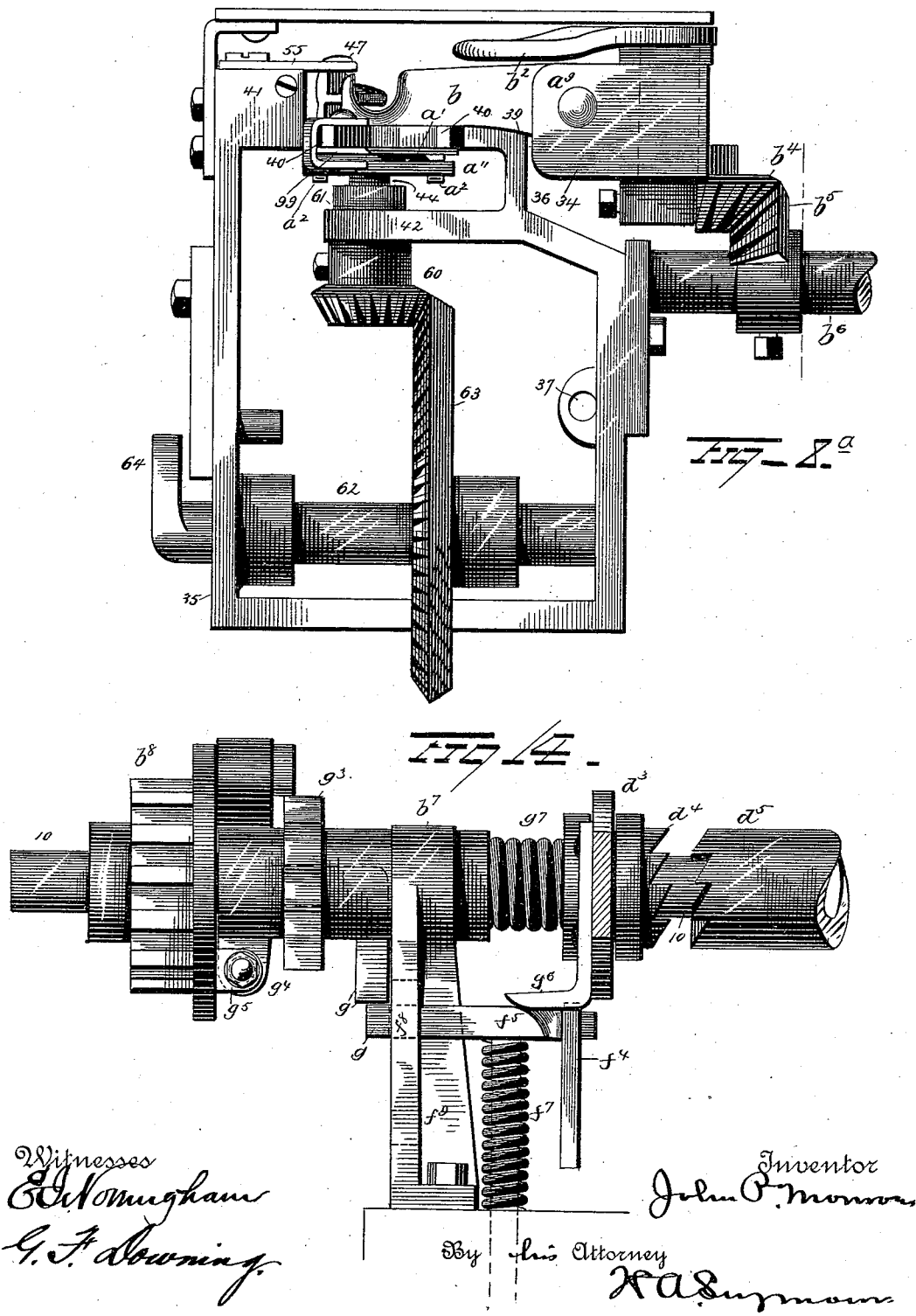

(No Model.) 13 Sheets—Sheet 10.
J. P. MONROE.
GRAIN BINDER.
No. 429,465. Patented June 3, 1890.
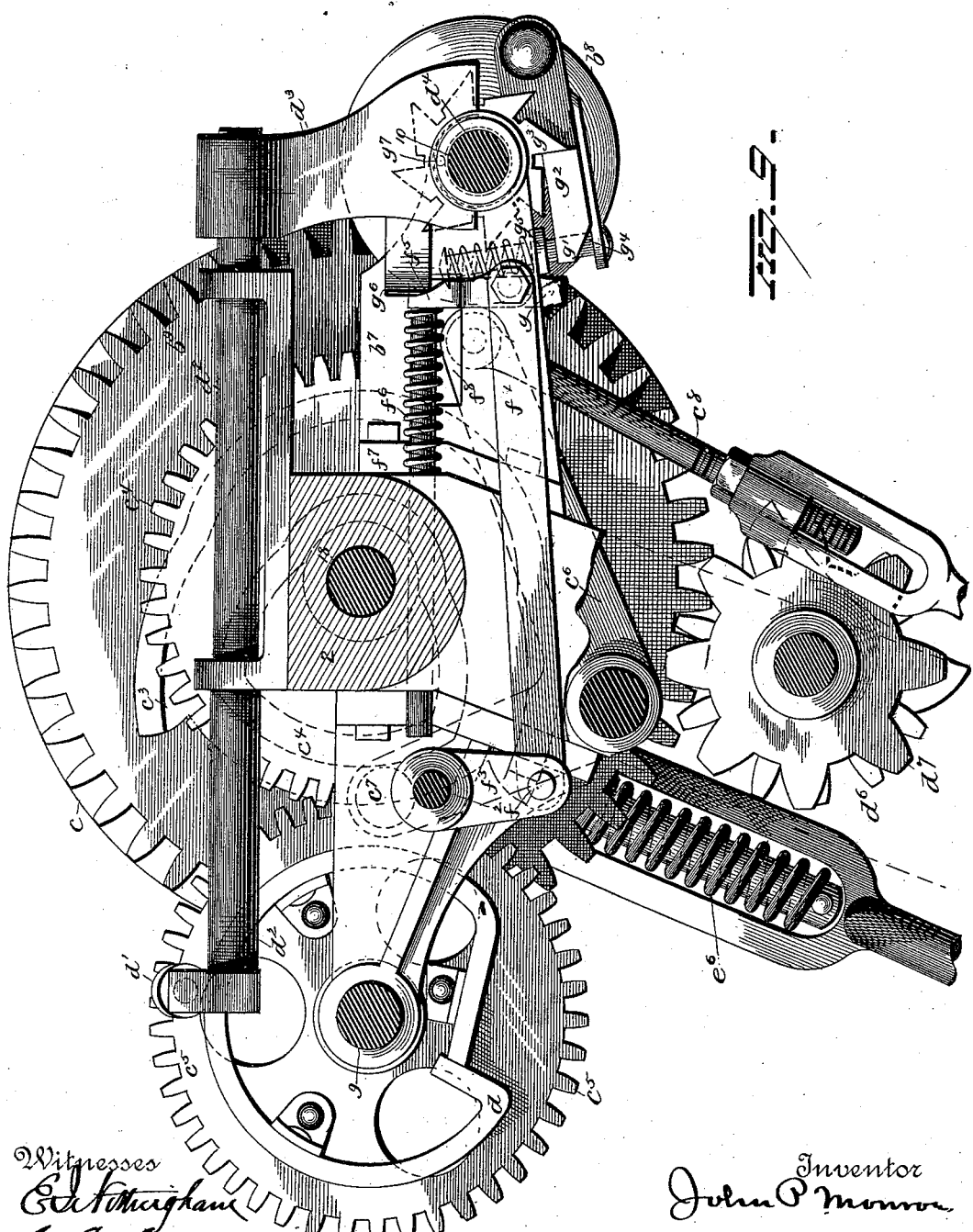

(No Model.) 13 Sheets—Sheet 11.
J. P. MONROE.
GRAIN BINDER.
No. 429,465. Patented June 3, 1890.
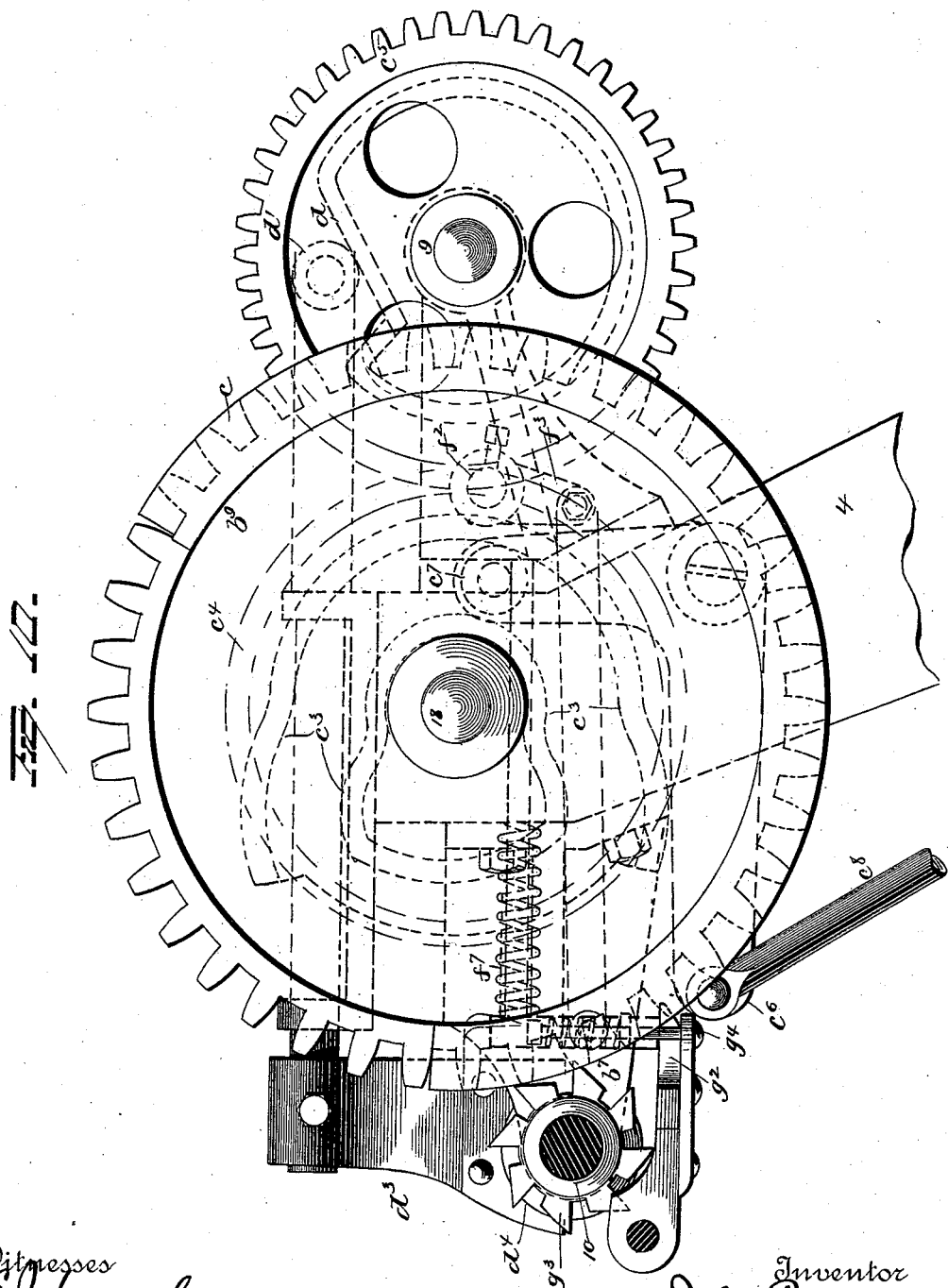

(No Model.) 13 Sheets—Sheet 12.
J. P. MONROE.
GRAIN BINDER.
No. 429,465. Patented June 3, 1890.
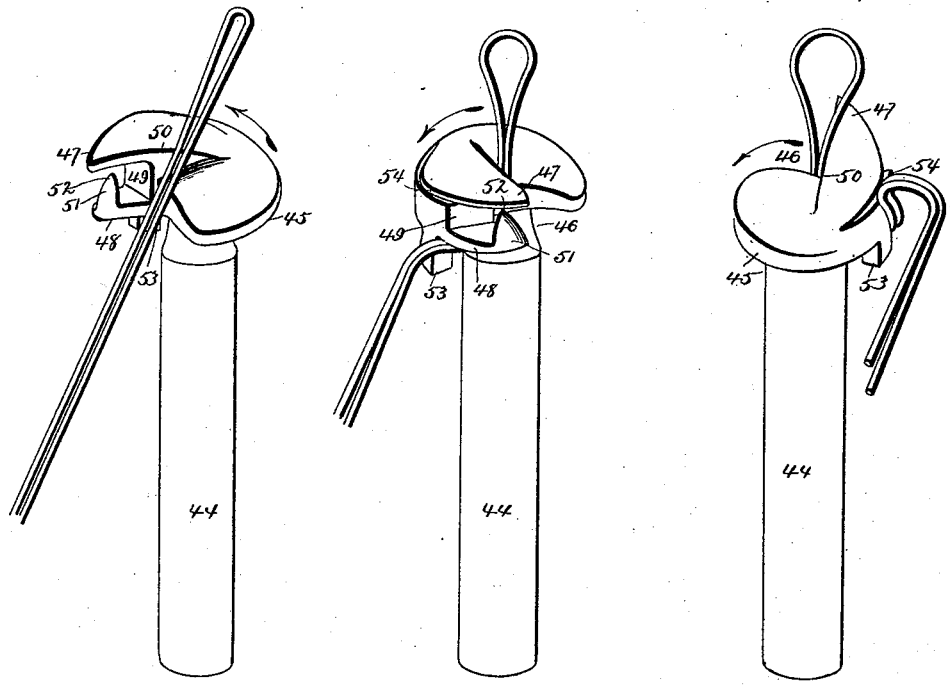
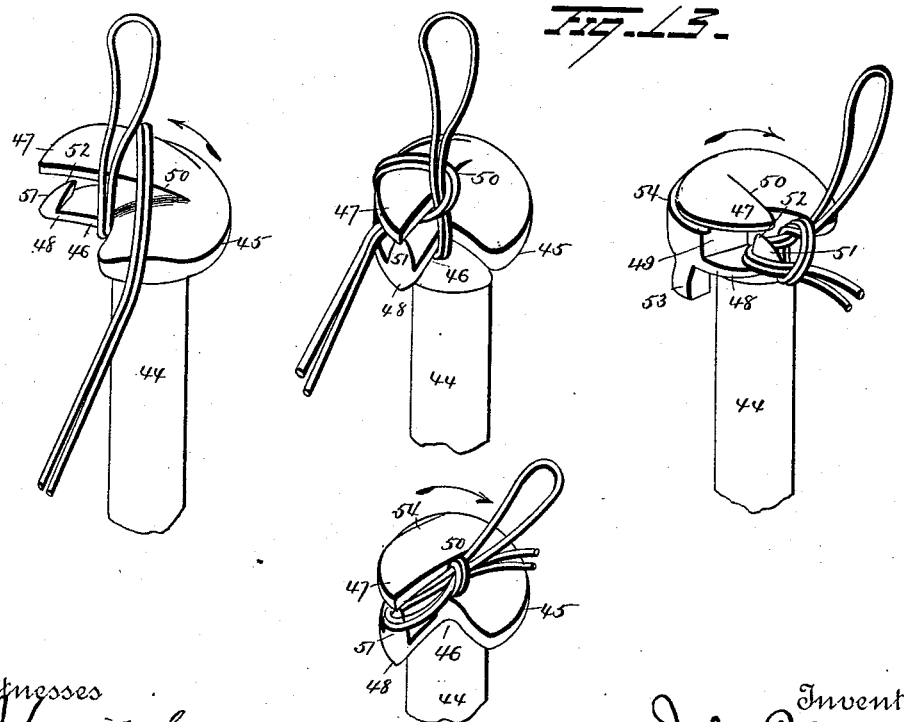
Fig. 13.
Witnesses
E. Nottingham
G. F. Downing
Inventor
John P. Monroe
By his Attorney
H. A. Sumner

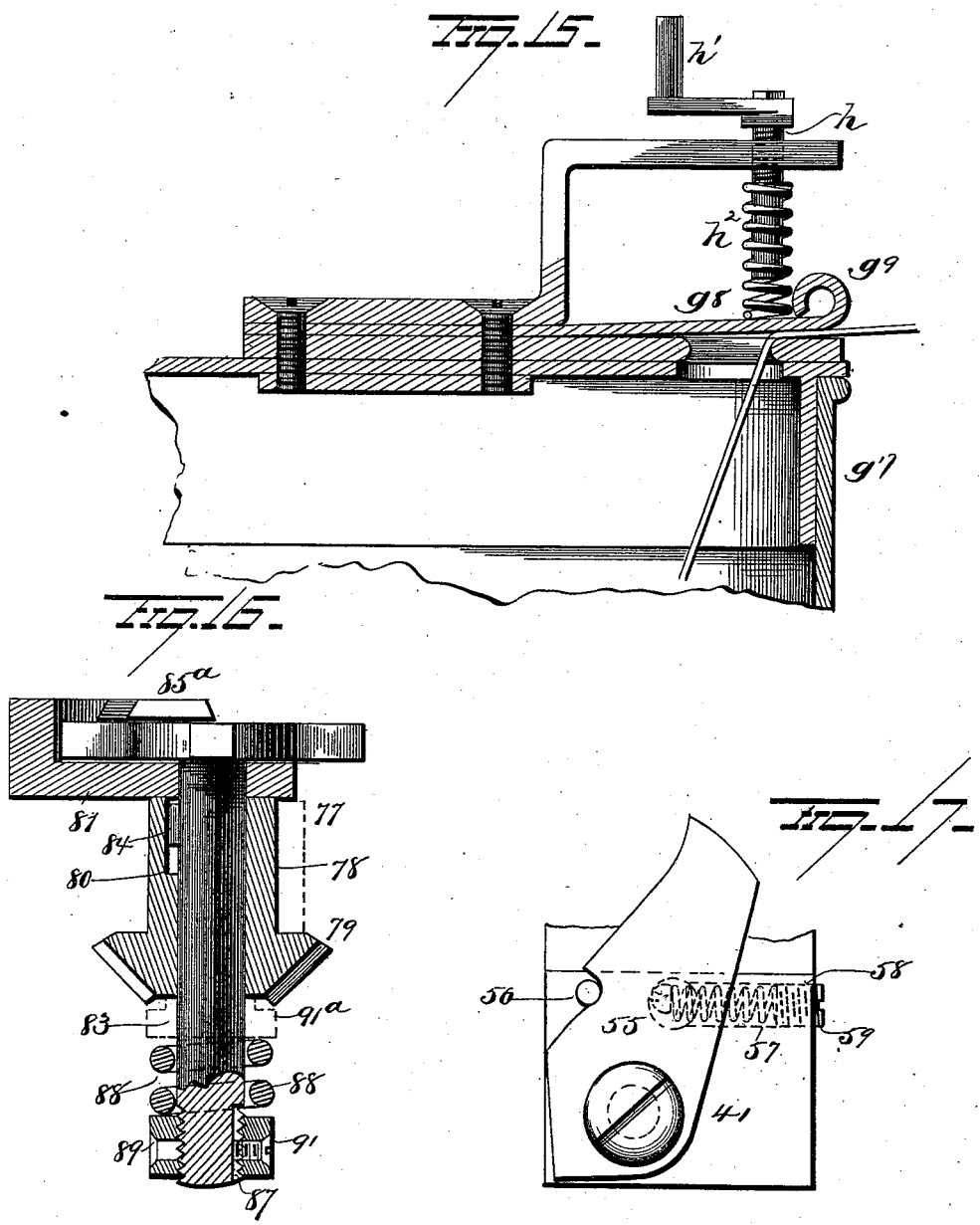

UNITED STATES PATENT OFFICE.

JOHN P. MONROE, OF LOUISVILLE, KENTUCKY.

GRAIN-BINDER.

SPECIFICATION forming part of Letters Patent No. 429,465, dated June 3, 1890.

Application filed February 9, 1889. Serial No. 299,302. (No model.)

*To all whom it may concern:*

Be it known that I, JOHN P. MONROE, of Louisville, in the county of Jefferson and State of Kentucky, have invented certain new and useful Improvements in Grain-Binders; and I do hereby declare the following to be a full, clear, and exact description of the invention, such as will enable others skilled in the art to which it appertains to make and use the same.

My invention relates to an improvement in self-binding harvesters.

Hitherto machines of this character have been constructed in one general line of improvements, and, as a consequence, where there has been a defect in one a similar defect has been traceable in all its successors, however much the machines were improved and the former faults were sought to be removed. Among some of the most notable of these errors are the following: first, that the machines are too large and heavy, necessitating the employment of heavy teams consisting of three and sometimes more horses, and also extra-sized gaps in the fences for the passage of the machines from one field or lot into another; second, that they consist of fragile and complicated parts, which become easily worn, broken, and rendered inoperative; third, that they consist of a great deal of spring-yielding mechanism, the various parts of which lack positiveness and precision of action; fourth, that they possess innumerable parts that require continuous and careful watching and frequent oiling and adjusting; fifth, several parts through which the binding-cord passes, which are liable to become broken or clogged; sixth, that the cord-carrying needle usually has a curved passage from beneath the machine upward through the straw, thus making the liability of becoming impeded or of its springing and giving more than ordinary; seventh, that the parts are not always geared to give positive movements and economize power.

It is the object of my present invention to obviate these defects, and, further, to provide mechanism and combination of mechanism whereby the number of parts is reduced to a minimum, the machine made lighter, the straw quickly and compactly bound, the cord securely tied around the bundle and cut, and the sheaves removed from the machine. The various parts are geared and timed to operate in positive and accurate motion with comparatively little friction and without backlash or other loss of motion.

To these ends the invention consists in reducing the gearing, making the various parts adjustable to compensate for wear and lost motion, reducing the parts of the knotter to a single piece, providing a needle with a positive up-and-down movement, whereby the straw is easily pierced and the twine is always carried to the knotter without loss of motion or impeding the motion of the machine, providing cams, shafts, cranks, and gears, whereby all the parts have positive, exact, and reliable movement.

The invention still further consists in certain novel features of construction and combinations of parts, as will be hereinafter fully described, and pointed out in the claims.

In the accompanying drawings, Figure 1 is a plan view of my improved self-binding harvester. Fig. 2 is an end view of the same, showing actuating-gears and connecting mechanism. Fig. 3 is a view of the opposite end, illustrating the tying mechanism, needle, compressor-arm, ejector-arm, trip, packers, and connected parts. Fig. 4 is a similar view illustrating a stage in the tying of a bundle of grain. Fig. 5 illustrates the relation of the several parts of the tying mechanism just before the completion of the knot. Fig. 6 is an enlarged detached sectional view of the tying mechanism. Fig. 7 is an enlarged plan view of a portion of the machine and operating-shafts. Fig. 8 is an enlarged plan view of the tying mechanism in the act of tying a bundle of grain. Fig. $8^a$ is an end view of the knotter-housing. Fig. 9 is an enlarged view on line $x\ x$ of Fig. 1. Fig. 10 is an enlarged view of some of the gears. Fig. 11 is a detached view of the shears or cutting devices. Fig. 12 is a detached view of the plate covering the knotter mechanism; and Fig. 13 represents views of the knotting-hook, illustrating the successive positions assumed in tying a completed knot. Fig. 14 is a detached view of the clutch mechanism. Fig. 15 is a view in section of the tension device. Fig. 16 is a view, partly in section and partly in elevation, of the cord-holding device; and Fig. 17 is a detached view, in elevation, of the knot-remover.

A represents the frame-work of the machine, and the numeral 1 represents a casting which is rigidly secured to the frame and constitutes the entire support of the binder mechanism. This casting is formed in two horizontal arms 2 and 3, the one above the other on opposite sides of the grain-passage, the former longer than the other and the two being joined at one end by the web 4. The casting is preferably made hollow to insure lightness, and it is provided with suitable flanges 5, whereby it is secured by bolts or other means to the frame-work. The upper arm is provided with a flange 6, extending laterally from its outer end, and a pair of castings 7 and 8 are secured to the end of this arm and the flange 6, respectively, for the support of the shafts 9 and 10. On the end of the upper arm the guide-plates 11 are bolted or otherwise secured. These plates are provided each with an anti-friction roller 12 at diametrically opposite points, these being all that is necessary, as the pressure exerted on the needle 12$^a$ is always in one direction both from the actuating mechanism and also from the pressure of the straw. This needle consists of a narrow flat strip of steel or hard metal, and at its lower rear end it is tapered down to form a sharp point 14, adapted to pierce the straw and carry with it the twine. The forward edge of this bar is also cut away, forming a recess 15, and just below this recess the end extends out in line with the edge of the bar, and through this portion the eye 16 is made to receive the twine which has been passed through the holes 17 in the guide-plates 11. The rotary shaft 18, which extends through the arm 2, is provided on one end with a crank 19, and the free end of this crank is connected with the upper end of the cord-needle by means of a link 20.

A pair of oppositely-projecting cranks 21 are removably secured by set-screws upon the main shaft 10, which is journaled at one end in casting 8, upon each side of the latter, and a pair of pointed knife-shaped packers 22 are loosely mounted on said cranks and adapted to be thrust downward into the straw coming from the elevators. It should be mentioned here that although the end packer can be slipped on or off the crank readily and held thereon by means of a key or pin 23, yet in order that they may be uniform, as there has to be some other means whereby they may be mounted on the inside crank, they are made with a removable section 20$^a$, which forms a part of the box around the crank. The stems 25 are preferably round, and they extend upward through slots in the ends of the guide-plate 26, which latter is rigidly secured to an upwardly-projecting arm of the casting 8. These stems, which may also be removably secured to the sections 22 and 20$^a$ (see Fig. 3) of the packers, hold the packers in position to enter the straw on the downstroke and push it forward, and to prevent frictional contact in their movement through the slots a pair of grooved anti-friction rollers 27 are journaled in boxes 28 at the ends of the slots in plate 26, and against these stems 25 reciprocate.

The breast-plate 29 is held by strap 30 to the castings 7 and 8, and this plate is slotted to allow portions of the machine to pass through it. The plate is bent up at one end to receive the straw from the grain-elevating belts down at the center, or point where the needle passes through, and up again at the forward end, where the bundle or sheave is formed.

Over the knotting mechanism the usual grain-table 31 is placed. The portion immediately over the knotter is preferably of metal, as the wear and tear at this point is very great, and the entire table is provided with suitable slots where they are needed to permit parts of the machine to enter. The metal portion of the table is secured rigidly to the frame, and the other portion is preferably removably attached. The slot 31$^a$, through which the cord passes, is enlarged at each end, one of the enlarged ends being for the passage of the needle carrying the cord and the other for the reception of the cord while the knot is being tied. Within the latter enlargement is located a roller 32$^a$, which prevents the cord or twine from coming in contact with the edge of the slot.

A hanger-plate 33 is rigidly secured to the shorter arm 3 of the casting 1, so that one face is flush with the end of this arm. This hanger is adapted to support one or more of the main actuating-shafts of the machine, and on its ends it is provided with flanges 34, in which certain rocking shafts, to be referred to, are supported. A rectangular housing 35 is rigidly secured to one end of this hanger-plate at right angles thereto, and within said housing the whole tying and cutting mechanism is held. Before describing this latter mechanism a brief description of the housing will follow. The lower portion is in the shape of a perfect rectangle, but the upper portion is somewhat peculiar, it being notched at one corner 36 and provided with a bearing 37 for one end of rocking shaft 38. Adjacent to this notched corner the upper face of the housing is flat for the most part, but provided with a depressed portion 39. Projecting laterally from this portion are a pair of V-shaped guide-jaws 40, adapted to receive the twine between the knotter and the holder to guide it between the blades of the shears, where it is cut. Above this flat face and adjacent thereto is the post 41, which supports the knot remover or stripper. A short distance beneath the flat upper face of this housing the arm 42 projects inwardly to a point a little beyond the center of the housing, and in the end of this arm and the upper portion of the housing the knotter is journaled. This knotter is in many respects an entire departure from those heretofore used, and therefore a detailed description will now ensue.

The knotter consists of a spindle 44, on the upper end of which is secured a circular disk 45. The latter is preferably flat on its lower face, and on its periphery is provided with a V-shaped notch 46. The upper face of the disk is convex over about a half of its surface, and over the remainder it is in the form of a gradual incline, which terminates in the pointed bill 47. One edge of this bill forms one side of the V-shaped notch 46, and immediately beneath this bill a similar-shaped one 48 is formed, its lower face being in line with the lower face of the disk and one edge forming one side of the V-shaped notch. Between these bills and integral with them the web 49 is formed, and between the inclined and the convex surface of the disk a shoulder 50 is made. To return to the lower bill, it will be seen that at its end an inclined hook 51 projects upwardly and inwardly, terminating in a point 52, over which the twine drops during the process of tying the knot. A lug 53 on the lower face of the disk, just beneath the web 49, prevents the twine from passing too far around beneath the disk during the rotation of the latter around the edge of the disk and sinking into the web 49. A groove 54 is provided to receive the end of a knot-remover 55 when the knotter reverses its motion. This knot-remover 55 consists of a plate pivoted on top of the post 41, with the stop 56 on one side to prevent the plate from moving too far in one direction and a spring 57 on the other side to keep its pointed end normally in the groove 54. This spring 57 is located in an orifice 58, where it impinges against a depending projection 57$^a$ on the plate. The orifice 58 is screw-threaded to receive a screw-plug 59, which confines the spring within the orifice. Thus it is seen that this spring is completely hid and shielded, so that no dust or other material can interfere with its operation. A bevel-pinion 60 is held by a set-screw or other means to the lower end of the knotter-spindle 44, and the latter is provided with an adjustable collar 61 immediately above the arm 42, by which the knotter and its pinion are held in position. A short rock-shaft 62 is supported in the lower end of the housing 35, and on this shaft the toothed segment 63 is secured by a suitable set-screw, so that it can be changed and adjusted in its position. This shaft is adapted to rock back and forth and its teeth are in mesh with the teeth of the pinion 60, so that the knotter is turned by the rocking motion of the segment. The outer end of the shaft 62 terminates in a crank 64, and the latter is connected by an extensible pitman 65 to the crank 66 on the end of the rotary shaft 67. Attention should be called to the fact that the crank 66 is somewhat shorter than crank 64, and the object of this is evident, for the latter is designed to rock as the former turns completely around. The rotary shaft 67 is supported in the hanger-plate 33 and also in a sleeve on the end of plate 68, which extends from the housing 35 forward. Cam-wheel 69 is held fast on rotary shaft 67 between the hanger-plate and plate 68, and besides having a cam-rim 70 on one (the right) side it has a cam-periphery 71, twin segmental cams 72 on the left side or side opposite the cam 70, and a slot 98 cut through the body of the disk. The functions of these cams will be explained in order, and to a complete understanding of the first or cam rim 70 a slight digression will here be necessary.

A vibrating arm 73 is pivoted in a sleeve 74 on the plate 68, and this arm is provided at its pivoted end with oppositely-projecting lugs 75 and 76, and at the free end it terminates in a box 77. The hub 78 of the bevel-pinion 79 is journaled in this box, and this hub and the pinion have a hollow bore, and the former a notch 80. A flanged clamp-plate 81 is seated on top of the box 77, where it is locked by the pin 82, extending into it. A bolt 83 extends through the bore of this hub and pinion, and the lug 84 in its side enters the notch 80, by which means the two are locked together. Star-wheel 85 is affixed to the upper end of the bolt 83. Said wheel is preferably provided with four projections or points, and as the machine is geared every time a knot is formed this star-wheel makes a quarter-revolution, so that the twine which is carried to the star-wheel by the needle is caught by one of its projections and wedged between it and the clamp-plate. It will be observed that this clamp-plate lacks a little of being a half-circle, so that when one of the projections on the star-wheel is just about to leave the clamp-plate and drop out a short waste piece of twine the projection diametrically opposite just reaches the other edge of the clamp-plate, taking a new hold on the twine, wedging it there after it has been looped around the bundle. A wedge-shaped plate 85$^a$ is inserted in a notch in the flange of the clamp-plate and projects over toward the center of the star-wheel, and this plate is locked in the recess by the head of set-screw 86, which projects over the butt-end of the plate. Between this wedge-shaped plate and the clamp-plate the end of the twine is forced by the intermediate projection of the star-wheel, which immediately precedes the projection which takes the twine after it has been passed around the sheaf. The object of this wedge-shaped plate is to give a tighter hold to the end of the twine and prevent its slipping. As the drawings illustrate, the end of the twine under the projection is also forced between the clamping-plate and the wedge-shaped plate, so that it is in the shape of a U around the projection. At each quarter-turn one projection is always entirely outside of the clamp-plate, and this projection throws out the waste piece of twine, so that by the next quarter-turn the wheel is ready to take a new hold of the twine. The lower end of the bolt is threaded and a groove 87 is cut on one side across the threads. When the parts are assembled—i. e., when the bolt is inserted through the pinion and its hub—a stiff spiral spring 88 is placed on it and held by the nut 89. The nut is loosened or tightened to regulate the tension of the star-wheel, and this nut is provided with screw-holes on each of its sides, so that when the nut is turned on sufficiently one of these holes will be opposite groove 87. A set-screw 91 may now be screwed into this hole without damaging the threads, for the reason that its end goes into the groove.

The angle-plate $91^a$ is secured to the side of the box 77, and its lower end extends beneath the box, receives the bolt 83, and holds the pinion in place. On its lower edge the box 77 is provided with a depending flange 92. A shaft 93 extends through this flange and the lug 76, and on the end projecting through the flange 92 a bevel-pinion 94 is secured, said pinion being meshed with the pinion 79. A rectangular cam 95 is secured to the other end of this shaft 93, and the corners of this cam are preferably rounded or cut off. Four pins 96 project forward from the rectangular cam in position to be engaged one at a time by a trip-pin 97 on the cam-wheel 69. The edges of the rectangular cam are adapted to have a bearing-contact upon the right side of this main cam-wheel and until the trip-pin 97 has engaged one of the pins 96 the shaft 93 is prevented from turning; but as soon as the trip-pin engages one of these pins a corner of the rectangular cam enters the slot 98 in the cam-wheel, thus allowing the rectangular cam to make one quarter-turn, or, in other words, to turn, so that the adjacent edge to that which has just been in contact with the cam-wheel is brought into contact. This shaft turns the bevel-pinions and the star-wheel a quarter-way around, as previously described. From the upper lug 75 an anti-friction roller 98 extends out laterally in position to engage the cam-rim 70. This cam-rim only extends about a third-way around the periphery of the cam-wheel, and its function is to keep the outer end of the vibrating arm 73 depressed as long as the roller is in contact therewith. It is only necessary that this arm be held in this rigid position until the twine is fastened in the twine-holder, and at this time the twine being tight around the sheaf has to have some slack while the knot is being tied. When this slack is necessary, the main cam-wheel has turned far enough, so that the roller 98 has run off of the cam-rim, and as soon as this takes place the arm is free to vibrate, and consequently rises just enough to furnish the required slack to form the knot. It then drops again by gravity as soon as the twine is cut, or if it fails to drop it is forced down as soon as the cam-rim 70 engages roller 98. This cutting mechanism will now be described.

The blade 99 is rigidly held in place beneath the upper plate of the housing 35, and it projects under one of the guide-jaws 40. Around this jaw a shield is fastened by a set-screw or otherwise, its lower flange or edge being removed far enough from the fixed blade to receive the other blade of the shears. The letter $a'$ represents this pivoted blade. This is pivoted on the spindle 44, and normally the blade rests beneath the other guide-jaw 40. A strap-plate $a^{11}$ beneath these blades of the shears holds them in place, and the tension of this strap-plate is regulated by the set-screws $a^2$. The rear end of the pivoted blade extends forward, and the link $a^3$ has pivotal connection therewith. A rocking shaft 38, supported in one flange of the hanger-plate 33 and the bearing 37, is provided with an adjustable collar to hold it in position. It is also provided with a pair of arms $a^6$ and $a^7$. The former is held on the shaft in the proper position by a suitable set-screw and in position to hold the shaft against endwise movement in one direction, and its free end is coupled to the connecting-rod $a^5$, while the latter $a^7$ projects from the opposite end of the shaft and is provided with an anti-friction roller $a^8$, which by contact with the twin cams 72 rocks the shaft first in one direction and then back, in which motion the pivoted blade of the shears swings forward, severs the twine, and then assumes its normal position. A similar shaft $a^9$ to the one just described is supported in the flanges of the hanger-plate 33, and on one end this shaft is provided with the twine-guiding hook $b$, which rises and falls at exactly the required moment to facilitate the bills in taking the twine in forming the knot. This hook is held in proper adjustment by a set-screw. On the other end an arm $b'$ is held in a similar manner, and this arm carries an anti-friction roller $b^{21}$, which engages the peripheral cam of the main cam-wheel, whereby the hook is vibrated at proper intervals. The tucker $b^2$ passes through a notch $b^{12}$ in the side of the needle and carries the cord over the knotter. This hook is mounted on a short vertical shaft $b^3$, and on the lower end of the latter a segmental gear $b^4$ is secured, which meshes with a similar gear $b^5$ on the rocking shaft $b^6$.

The gearing which actuates the packing and knotter mechanism is located on the opposite side of the casting from the mechanism which has just been described. The main shaft 10 is driven from the actuating mechanism of the reaper. This shaft is supported at this end in a bracket-arm $b^7$, and it is provided outside of this bracket-arm with a flanged pinion $b^8$, loosely mounted thereon. A large mutilated gear-wheel $b^9$ is fastened to the adjacent end of rotary shaft 18. This wheel has a cam-flange $c$ on a portion of its outer edge, and where this flange ends the wheel is cut away. Teeth at this point extend across the rim of the wheel, but back of the flange they only extend part way across, leaving the groove $c^2$ between them and the flange.

This large wheel is in constant engagement with the flanged pinion $b^8$, and is driven by the latter, which makes exactly four revolutions to one of the large wheel. The back of this wheel is provided with a cam $c^3$, and a bell-crank lever $c^6$, pivoted to the machine, is provided with an anti-friction roller $c^7$ at one end, adapted to follow the cam $c^3$, thus giving a rocking motion to the bell-crank at suitable intervals. At its opposite end this bell-crank lever is connected by an extensible pitman $c^8$ to the crank $c^9$ on the end of rocking shaft $b^6$, which, as before noted, operates the cord-tucker. Back of the mutilated gear-wheel $b^9$ a large pinion $c^4$ is mounted on the shaft 18, and the teeth of this wheel mesh with a similar and equal-sized gear-wheel $c^5$, mounted on shaft 9. This wheel is held in place by a suitable set-screw, and hence its position may be readily changed. A cam $d$ on the inside face of this wheel has engagement with the roller $d'$ on the arm of rocking shaft $d^2$, whereby the latter is rocked at suitable intervals or after the gear-wheel $c^5$ has made one complete revolution, which takes place during the tying of the knot. A shipper $d^3$ depends from the opposite end of the shaft $d^2$, and this engages the movable section $d^4$ of the clutch on the main shaft and is adapted to remove it during the tying of the knot from the fixed section $d^5$ of the clutch, so as to stop the operation of the packers 22. This clutch consists of two sections $d^4$ and $d^5$ on shaft 10, the former being loosely mounted so as to slide on one section of the shaft, but keyed thereto so as to revolve with same, and the latter rigid with the other section of the shaft, and each having teeth, which, when the two parts of the clutch are together, interlock and transmit the motion to the packers 22. The loose section of the clutch is yieldingly held in contact with the rigid section by spring $g^7$.

Beneath the mutilated gear-wheel a gear-wheel $d^6$ is mounted, the said wheel having a cut-away section or shoe adapted to ride over the cam-flange $c$ and prevent the gear from turning during a portion of the revolution of the wheel, the teeth of the gear meanwhile extending into the groove $c^2$. The moment the cam-flange is passed the teeth of the wheel become meshed with the teeth of the mutilated gear. A sprocket-wheel $d^7$ back of this gear communicates motion through a sprocket-chain $d^8$ to the sprocket-wheel $d^9$ on the end of shaft 67. The hub of the sprocket-wheel $d^9$ is provided with teeth, which mesh with the teeth on the clutch-section $e^{29}$, rigidly secured to shaft 67, and is held in contact with said clutch-section by nut $e$, screwed onto the end of the shaft. By removing the nut $e$ the two sections of the clutch can be disconnected and the position of the shaft relative to the wheel changed, if necessary. A chain-tightener $e'$ on the end of the casting may be adjusted back and forth to regulate the tension of the sprocket-chain. A compressor-arm $e^{11}$ is affixed to one end of the shaft $e^2$, and to the opposite end of said shaft a crank $e^3$ is held, and this crank is connected by a pitman $e^{13}$ to the wrist $e^4$ on the mutilated gear-wheel. It is essential that this compressor-arm should not be perfectly rigid in its operation, and hence this pitman $e^{13}$ is of peculiar formation. This pitman consists of a lower section mounted on crank $e^3$ of the compressor and provided with a screw-threaded socket in its upper end, a central section having a screw-threaded stem which enters the socket in the lower section and is locked therein by nut $e^5$ and a link-shaped upper end, and an upper section consisting of a stem which passes through the end wall of the link-shaped upper end of the middle section and a slotted upper end, which engage the wrist-pin $e^4$ on wheel $b^9$. A spiral spring $e^6$ encircles the stem of the upper section and bears at one end against a pin passing through the free end of the stem and at its other end against the upper end of the link-shaped end of the middle section. The pitman can be lengthened or shortened by elevating nut $e^5$ and turning the middle section in the proper direction.

The wrist $e^4$ on the mutilated gear-wheel works in the slot $e^7$ of the upper section of the pitman, and by the construction above described, when the wrist is at its extreme throw, instead of carrying the compressor-arm inflexibly forward, the latter is permitted to yield as the straw becomes packed tightly against it. It is noticeable that the wrist $e^4$ does not begin to raise the compressor-arm until the point of the needle has descended to the platform; otherwise the compressor would only force the straw back and would do more harm than good. The compressor continues to move forward until the wrist $e^4$ has reached its farthest throw, at which period the needle has also reached its lowest point, when it begins to ascend. The opposite throw of the wrist $e^4$ forces the compressor-arm down into slot $e^{14}$ in the frame, and to raise this arm, when released by the pitman $e^{13}$, a spring $f$ is resorted to. This spring is mounted on a rod $e^8$, pivoted to an arm on the shaft, and passes loosely through a loop $e^9$, which latter supports it. This loop also serves as an abutment for one end of the spring, and a nut on the other end of the rod acts as the other abutment. The action of the spring in assuming its normal shape after it has been compressed by the depression of the compressor raises the compressor again above the platform or table. The ejector $f'$ on the shaft 9 is adapted to make one complete rotation during the operation of tying, and in so doing it comes in contact with the bundle and forces it out of the binder. All of this gearing, excepting the main shaft 10, has a periodical movement; but this main shaft revolves continuously while the machine is in motion, excepting the section which carries the packers, and this also has a periodical motion. This shaft revolves and operates the packers until a sufficient and predetermined sized bundle is formed. The size of this bundle is determined by the trip $f^{11}$, which projects loosely through the breast-plate, where it is engaged by the straw which is packed against it and the compressor-arm. This trip is fixed on the rod $f^2$, and a crank $f^3$ on the latter is connected by a link $f^4$ to the latch $f^5$. The stem $f^6$ of this latch extends loosely through a hole in the web 4, and is provided with a spring $f^7$, which normally holds the latch back in the slot $f^8$ in the bracket-arm $b^7$. This slot guides and limits the motion of the spring-actuated latch, while a horizontal flange $f^9$ on the bracket-arm prevents the latch from turning. A finger $g$ projects downward from the latch and is adapted to normally engage a similar finger $g'$ on the pivoted locking-pawl $g^2$. This locking-pawl is pivoted to the flange of flanged pinion $b^8$ in position to engage the teeth of ratchet-wheel $g^3$, which latter is fast upon the main shaft 10 adjacent to the flanged pinion. A pin $g^4$ on the free end of this pawl passes loosely through the eyelet $g^5$ on the flanged pinion and is provided with a spiral spring which tends to hold the pawl in engagement with the teeth of the ratchet-wheel, which engagement takes place the instant it is permitted; but, as previously mentioned, the finger $g$, by its engagement with finger $g'$, normally holds this pawl out of engagement with the teeth of the ratchet-wheel. The moment the finger $g$ is withdrawn by the tight impact of the straw against the trip $f^{11}$ the pawl engages the teeth of the ratchet-wheel and travels around with the latter, locking the flanged pinion to the main shaft, thereby communicating motion to the needle, the knotter, and other parts of the machine during the operation of tying the bundle. Four revolutions of the main shaft are necessary in order to complete the operation of these parts. A toe $g^6$ on the shipper $d^3$ engages the latch, holding it back out of the way of the now rotating finger $g'$ as long as the movable section $d^4$ is held out of engagement with the fixed section $d^5$ of the clutch by the contact of the roller $d'$ with the cam $d$, and until the said roller enters the bend in this cam, when the spring $g^7$ forces the movable section of the clutch against the fixed section, and the toe $g^6$ is disengaged from the latch and the finger $g$ of the latter made to again engage the finger $g'$ by the action of the spring $f^7$.

The twine is carried in a box $g^{17}$, the lid of which is provided with an opening for the passage of the cord and with the tension device $g^8$. This tension device consists of a plate $g^9$, the free end of which rests over the cord-opening in the lid, so as to bear on the cord. A bracket secured to the lid carries a screw $h$, to which is attached a spring $h^2$, the lower end of which bears on the top of the plate $g^9$ and holds the latter down on the cord. By turning handle $h'$ of the screw $h$, so as to compress the spring, the pressure or tension of plate $g^9$ on the cord is increased, and by turning the screw in a direction to relax the spring the tension is diminished.

The operation of the entire mechanism is as follows: Motion is imparted to the main shaft 10 from the driving mechanism of the harvester. This shaft drives the packers 22 until the sheaf has assumed a predetermined size. The twine which was left by the receding needle after tying the last bundle across the space between the platform and the breast-plate 29 is thus in readiness to encircle the straw which the packers force against it. When the bundle has reached its proper size, it is crowded with sufficient force against the pendent trip $f^{11}$ to force it forward. This immediately starts the binder-gearing by drawing forward the latch $f^3$ and removing the finger $g$ from the finger $g'$ and permitting the pawl $g^2$ to engage the teeth of the ratchet-wheel $g^3$. This locks the flanged pinion $b^8$ to the main shaft, and this pinion instantly sets in motion the large mutilated gear-wheel $b^9$ and the two pinions $c^4 c^5$, the immediate effect of which is to simultaneously start the cord-carrying needle 12 downward, owing to its connection with the shaft 18, to revolve the bundle-kicker on the shaft 9 and to disengage the clutch $d^4 d^5$, due to the action of the cam $d$ upon the roller $d'$. This disengagement of the clutch stops the packers 22, and they remain stationary from this period until the bundle is tied and completed, they tending by their inaction to hold back the straw being fed from the harvester. The motion continuing, the needle pierces through the straw, leaving the twine in its track. For a short period now the needle and kicker-arm are the only parts of the binder in operation, except their immediate actuating mechanisms. These continue to move alone until the point of the needle drops slightly below the knotter-bills. By this time the compressor-arm $e^{11}$ begins to move back, owing to the action of the wrist $e^4$ in the extensible pitman $e^3$. This compressor-arm continues in unison with the other two moving parts, pressing the bundle compactly between it and the needle until it is time to remove the bundle from the binder. Just before these parts have stopped the tucker $b^2$ begins to swing laterally toward the needle through the action of bell-crank lever $c^6$, and before the latter stops just below the twine-holder the tucker has swung past it nearly over the knotter 43, forcing the twine with it forward until the two portions come together beneath the bundle. The needle now has reached its lowest point and begins to return. The teeth of half-moon gear $d^6$ have now left the groove $c^2$, and, meshing with the teeth of mutilated gear $b^9$, the sprocket-chain is driven, and the cam-wheel 69 on the opposite end of the shaft which carries the sprocket-wheel with which the chain is connected begins to revolve. The shaft to which this wheel is secured, being immediately geared through pitman 65 and segment 63 on shaft 62 with bevel-pinion 60, is now ready to start the knotter from its normal position with its bills pointed backward to the left, the two parts of the twine being held in the notch 46 and over the disk 45 at an angle of about forty-five degrees. Meanwhile the rectangular cam 95 has been turned a quarter-way around, the trip-pin 97 having struck pin 96, and through the bevel-gear pinions 79 and 94 the cord-holder has made a quarter-turn also, securing the cord. The bills now turn to the left a little way and the guiding-hook $b$ begins to rise, raising the twine after it has been taken by the bills, so as to hold it over the convex upper surface of the knotter when it has made a half-turn. To make the knotting operation clear at this point, let us follow the twine back with the knotter in this adjustment—that is, half-way around. The twine extends from the sheave under the tucker, then vertically through the notch 46, then beneath the bills, where it lies against lug 53, then upward obliquely over the groove 54, shoulder 50, and over the convex upper face of the knotter-disk. The function of the guiding-hook $b$ is now apparent, for it holds the twine above the plane of the bills 47 and 48, so that as the knotter turns the cord slips over its convex surface and the bills on the second round receive the twine between them. The cord is now in the form of a twisted loop around the hooked bill 48 and back of the hook 51. By this time the needle has started to recede, having done its work for this bundle, and as it goes it lays the twine in its path for the next. At this stage the spring-actuated knot-remover 55 has allowed the cord, which, it was stated, was lying across the groove 54, to force it back a little, enough to pass under and assume its position again in the groove 54 close to the cord. The knotter by this time has completed its forward motion or a one and a quarter revolution, and the crank 64, having swung its distance in one direction, begins to swing back, thus reversing the knotter one complete turn back to its normal position. Just prior to this, however, the shears have been operated and the twine has been severed below the knotter. During this reversing the twine has been pushed off of the upper bill around the twine outside of the hooked bill, thus forming a knot at that point, the loop around the hook slipping off as the knotter reverses and before it assumes its normal position again. When it has reached such position, it will be seen that the knotter has made a turn and a quarter to the left and then a turn and a quarter to the right, bringing it always to its starting-point ready for the next knot. While the knot is tying, the other parts one by one assume their normal positions, and by the time the needle has reached its highest point the parts of the clutch come together, the packers begin work for the next bundle, and the rest of the mechanism awaits the pushing aside of the trip $f^{11}$, when they again repeat the operation just described.

To thread the machine or put in a new ball of twine, the end is passed beneath the tension, the latter being tightened properly, and thence it is passed through holes 17, the eye 16, and secured to some part of the machine. The first operation secures the twine in the holder, and after this all bundles are tied.

It need only be mentioned in conclusion that the binder as constructed is adapted with very slight modification to be applied to low-down binders as well as other kinds, and this is evidenced by the fact that the needle has a vertical motion from above instead of from below. One further remark, and that is, that the parts are all made adjustable, so that they may be changed to compensate for wear or any other defects that might arise.

It is evident that slight changes might be resorted to in the form and arrangement of the several parts described without departure from the spirit and scope of my invention; hence I do not wish to limit myself to the exact construction herein set forth; but, Having fully described my invention, what I claim as new, and desire to secure by Letters Patent, is—

1. In a self-binding harvester, the combination, with a grain-table and a knotter located below same, of an approximately-horizontal frame located below the knotter, the said frame being pivoted at one end, the opposite end adapted to move away from the knotter by gravity, a cord-clamping wheel carried by said frame, a rotary shaft journaled in said frame, gearing connecting the shaft and cord-clamping wheel for rotating the latter, and a wheel having a single tooth for imparting a part revolution to the rotary shaft at each revolution of the wheel, substantially as set forth.

2. In a self-binding harvester, the combination, with a grain-table and a knotter located below same, of a frame located approximately at right angles to the knotter-shaft, the said frame being pivoted at one end, so that its opposite end moves away from the knotter by gravity, a cord-clamping wheel carried on the free end of said frame, a shaft journaled in the frame, gearing located near the free end of the frame and connecting the shaft and cord clamping plate, and a wheel located near the pivoted end of the frame for actuating said shaft, substantially as set forth.

3. In a self-binding harvester, the combination, with a knotter, of a frame movable toward and away from the knotter, a rotating cord-holder carried by said frame, a rotary shaft journaled in bearings on said frame, gearing connecting the cord-holder and shaft, whereby the former is actuated by the latter, a needle for carrying the cord to the cord-holding plate, a tucker for carrying the cord to the knotter, a single wheel for rotating the cord-holder and for holding the same away from the knotter while the latter is at rest, and a guiding-hook for holding the cord in position to be engaged by the bills of the knotter, substantially as set forth.

4. In a self-binding harvester, the combination, with a grain-table and a needle having a positive endwise motion mounted in bearings located above the table, of a knotter located below the table, a cord-holder located below the knotter and having a movement toward and away from the knotter, a shaft, gearing connecting said shaft and cord-holder, and a single wheel for rotating the shaft and for holding the cord-holder away from the knotter while the latter is at rest, substantially as set forth.

5. The combination, with a slotted table and breast-plate, a straight needle having an endwise movement through said table and breast-plate, a rotary shaft, crank thereon, and a link connecting the crank and needle, of a knotter, a rotating cord-holder movable toward and away from the knotter, and a tucker for carrying the cord over to the knotter, substantially as set forth.

6. The combination, with a suitable casting, a bracket thereon, main actuating-shaft revolubly supported in said bracket, and a shaft similarly supported in the casting, of a cord-needle mounted in bearings carried by the casting and having a positive endwise movement, means for actuating the latter from the shaft in the casting, cranks, packers carried by the cranks, and means for guiding the packers in their movement, substantially as set forth.

7. The combination, with a casting having arms thereon, a bracket projecting from one of the arms, and a slotted plate rigidly secured on the bracket and having anti-friction rollers at the ends of the slots, of a crank revolubly supported in the bracket, and packers on the cranks, one end of said packers extending loosely through the slots and the other ends adapted to feed the straw, substantially as set forth.

8. In a self-binding harvester, a cord-knotter made in one piece and having bills thereon, one of which projects in line with the lower face of the knotter and the other at an inclination thereto, substantially as set forth.

9. In a self-binding harvester, a cord-knotter made in one piece with a flat lower face and a convex and inclined upper face, said knotter having a pair of bills, one in a plane with the lower face and the other in a plane with the inclined portion of the knotter, substantially as set forth.

10. A cord-knotter made in one piece and having two bills, one of which projects at an inclination to the other, and also provided on its periphery with a groove, the latter being in a plane passing between the bills, substantially as set forth.

11. A cord-knotter made in one piece, with a flat lower face and a convex upper face with a notch in its periphery, and a pair of bills, one in a plane with the lower face of the knotter and the other at an inclination thereto, and a groove formed in the periphery of the knotter just below the upper bill, substantially as set forth.

12. In a grain-binding harvester, the combination, with a knotter made in one piece and having two bills, one of which projects approximately in line with the lower face of the knotter and the other at an inclination thereto, and provided with a groove, the latter being in a plane passing between the bills, of a spring-actuated cord-remover adapted to bear in said groove and remove the cord from the bills during the reverse movement of the latter, substantially as set forth.

13. In a grain-binding harvester, a cord-knotter made in one piece and having bills thereon, one of which projects approximately in line with the lower face of the knotter and the other at an inclination thereto, one of said bills having a hook projecting inwardly toward the other bill, substantially as set forth.

14. In a grain-binder, the combination, with a cord-knotter made in one piece and having two bills, one of which projects approximately in line with the lower face of the knotter and the other at an inclination thereto, of a guiding-hook for guiding the cord to the knotter-bills and a cord-remover resting in contact with the knotter for pushing the cord from the knotter, substantially as set forth.

15. The combination, with a knotter, a needle, a cord-holder movable toward and away from the knotter, and a tucker located above the knotter and adapted to carry the cord from the needle to the knotter, of a cord-cutter mounted on a stationary bearing located between the knotter and movable cord-holder, substantially as set forth.

16. The combination, with a housing having a knotter and a rocking shaft supported therein at right angles to each other, the former having a bevel-pinion thereon and the latter having a toothed segment meshed with said pinion, of a pair of guide-jaws, shear-blades therein, one fixed and the other pivoted, and means for rocking the shaft whereby the knotter is operated and for operating the pivoted blade of the shears, substantially as set forth.

17. In a self-binding harvester, a cord-holder consisting of a substantially-semicircular clamping-plate having a flange on its rounded edge and an inwardly-projecting plate thereon, and a star-wheel, the projections of which are adapted to force one end of the cord in contact with the clamping-plate and the other between the latter and the inwardly-projecting plate, substantially as set forth.

18. The combination, with a vibrating arm having a box on its end and a clamping-plate seated on the box, of a star-wheel loosely mounted in the clamping-plate, said wheel having a bolt projecting therefrom, the latter being screw-threaded at its end and having a groove therein, bevel-pinions, means for actuating said pinions, a spring on the end of the bolt, a nut for holding the spring on, this nut having holes in each side, and a set-screw adapted to enter one of the holes and the groove, whereby the nut is held on the bolt without injury to the threads, substantially as set forth.

19. In a self-binding harvester, a cord-holder consisting of a vibrating arm, a clamping-plate, a four-toothed star-wheel, gearing for turning the latter a quarter-way, a spring and nut for regulating the tension of the star-wheel, said nut having holes in each of its sides, and a set-screw for securing the nut in place by impinging in a groove in the stem of the star-wheel, substantially as set forth.

20. The combination, with a housing, a plate secured thereto, a vibrating arm, a cord-holder therein, gear-wheels for turning the cord-holder, a shaft connected with one of said gear-wheels, this shaft having a rectangular cam thereon, and pins projecting from the latter, of a cam-wheel having a slot and a trip-pin therein, whereby the rectangular cam is turned by the engagement of the trip-pin with one of the pins on the rectangular cam, substantially as set forth.

21. The combination, with the housing having guide-jaws thereon, of a fixed and a pivoted blade, a strap and set-screws for drawing the said blades together, a rocking shaft connected with the pivoted blade, and a cam-wheel for rocking said shaft, substantially as set forth.

22. The combination of a knotter having a groove in its periphery, a cord-remover, the free end of which is adapted to enter said groove, a cord-holder, shears located between the knotter and holder, a guiding-hook for elevating the cord to the knotter, and a tucker moving at right angles to the guiding-hook for carrying the cord within reach of the knotter.

23. The combination, with a reciprocating needle, of a compressor-arm, a spring for imparting a yielding compressional action to the latter, means for throwing the compressor-arm beneath the table, and a spring abutment or rest for raising it again above the latter, substantially as set forth.

24. In a grain-binder, the combination, with the frame, a casting, a needle, and knotting mechanism, of a table one section of which is secured to the machine and the other removable, the former having an elongated slot therein with a restricted central portion and an anti-friction roller in said slot, substantially as set forth.

25. The combination, with a cord-box, of a removable cover having an opening therein, a plate secured to said cover with its free end over the opening therein, a bracket or frame secured on said removable cover, the raised portion of the bracket or frame overhanging the free end of the plate, a screw mounted in the overhanging portion of the bracket, and a spring attached to the screw, and a bearing on the free end of the plate, substantially as set forth.

26. The combination, with a main shaft having a crank-section carrying packers, means for clutching and unclutching the section, and a shaft carrying a mutilated gear-wheel, of a pinion on the main shaft meshed with the mutilated gear-wheel, means for locking it to the main shaft, tripping mechanism operated by the straw, and a pinion also engaged by the mutilated gear and with the mechanism for actuating the knotting mechanism, substantially as set forth.

27. The combination, with the main shaft, ratchet-teeth thereon, and a pinion loosely mounted thereon, of a spring-actuated pawl pivoted to the pinion, said pawl having a finger thereon, a spring-actuated slide-latch having a finger adapted to normally engage the finger on the pawl and there hold the latter out of engagement with the ratchet-teeth, a trip, a rocking shaft on which the latter is secured, and a link connecting an arm on said rocking shaft with the latch, substantially as set forth.

28. The combination, with a main shaft having a pinion loosely mounted thereon and a mutilated gear-wheel meshed with the pinion, said wheel having a cam on its back, of a knotting device, a cord-tucker, shaft and gearing connecting the latter, and a bell-crank lever having an anti-friction roller on one end in engagement with the cam on the mutilated gear-wheel, said lever connected at its other end with the shaft which actuates the tucker, substantially as set forth.

29. The combination, with a main shaft, teeth thereon, a pinion loosely mounted thereon, a pawl, latch, and a trip, of a packer, a crank-shaft, a clutch, a clutch-shipper, means for operating the latter, and a shoulder on the shipper for engaging the latch and holding it back during a certain number of revolutions of the main shaft, substantially as set forth.

30. The combination, with the main shaft, a pinion thereon, a mutilated gear-wheel meshed with the pinion, said wheel having a cam-flange thereon, and a gear-wheel in engagement with the mutilated gear-wheel, the said gear-wheel having a curved shoe thereon, of binding mechanism, a shaft for operating the latter, and means for communicating motion from the gear-wheel to said shaft.

31. The combination, with the mutilated gear-wheel and means for actuating the same, said wheel having a wrist thereon, of a compressor-arm, its shaft, a crank on the latter, an extensible yielding pitman connecting the wrist and crank, and a spring rest or abutment for raising the compressor-arm after it has been depressed and holding it in position, substantially as set forth.

32. In a grain-binding harvester, the combination, with a knotter, of a rotary cord-holder movable toward and away from the knotter, a shaft for rotating the cord-holder, a rectangular cam on said shaft, pins projecting from one face of the cam, and a slotted wheel having a trip-pin for giving the rectangular cam a part turn at each revolution of the slotted wheel, substantially as set forth.

In testimony whereof I have signed this specification in the presence of two subscribing witnesses.

JOHN P. MONROE.

Witnesses:
S. G. NOTTINGHAM,
GEO. F. DOWNING.